United States Patent
Choi et al.

(10) Patent No.: US 10,630,458 B2
(45) Date of Patent: *Apr. 21, 2020

(54) ADAPTIVE OPERATIONAL FULL-DUPLEX AND HALF-DUPLEX FDD MODES IN WIRELESS NETWORKS

(71) Applicant: APPLE INC., Cupertino, CA (US)

(72) Inventors: Hyung-Nam Choi, Hamburg (DE); Maik Bienas, Braunschweig (DE); Martin Hans, Bad Salzdetfurt (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,830

(22) Filed: Sep. 7, 2018

(65) Prior Publication Data
US 2019/0007188 A1    Jan. 3, 2019

Related U.S. Application Data

(63) Continuation of application No. 15/130,270, filed on Apr. 15, 2016, now Pat. No. 10,075,281, which is a continuation of application No. 14/034,122, filed on Sep. 23, 2013, now Pat. No. 9,319,210, which is a continuation of application No. 12/156,544, filed on Jun. 2, 2008, now Pat. No. 8,542,617.

(51) Int. Cl.
| | | |
|---|---|---|
| *H04L 5/16* | (2006.01) | |
| *H04W 72/12* | (2009.01) | |
| *H04L 5/14* | (2006.01) | |
| *H04L 12/26* | (2006.01) | |
| *H04L 1/18* | (2006.01) | |
| *H04W 56/00* | (2009.01) | |

(52) U.S. Cl.
CPC .............. *H04L 5/16* (2013.01); *H04L 5/14* (2013.01); *H04L 43/16* (2013.01); *H04W 72/121* (2013.01); *H04L 1/1812* (2013.01); *H04W 56/0045* (2013.01); *H04W 72/1226* (2013.01); *H04W 72/1289* (2013.01)

(58) Field of Classification Search
CPC ......... H04L 5/14; H04L 5/143; H04L 5/1461; H04L 5/0053; H04L 5/16; H04L 5/18
See application file for complete search history.

(56) References Cited

U.S. PATENT DOCUMENTS

| | | | |
|---|---|---|---|
| 7,415,282 B2* | 8/2008 | Tillet ................ | H04W 76/20 455/509 |
| 2005/0207360 A1* | 9/2005 | Costo ................ | H04L 1/0002 370/282 |
| 2008/0056183 A1* | 3/2008 | Gorokhov .......... | H04L 1/0026 370/329 |

* cited by examiner

*Primary Examiner* — Jamal Javaid
(74) *Attorney, Agent, or Firm* — Fay Kaplun & Marcin, LLP

(57) ABSTRACT

Methods and apparatus that enable a wireless network system to dynamically change between full-duplex FDD operation and half-duplex FDD operation in order to take advantage of operational aspects of both modes. In one embodiment, an alternative duplex mode of operation is disclosed (semi-static half duplex FDD operation) that enables coordination between the client device (e.g., UMTS UE) and the base station in order to centralize control of radio resource control (RRC) to the base station. The disclosed methods and apparatus may also advantageously incorporate hybrid ARQ (HARQ) or comparable timing requirements into their operation.

20 Claims, 11 Drawing Sheets

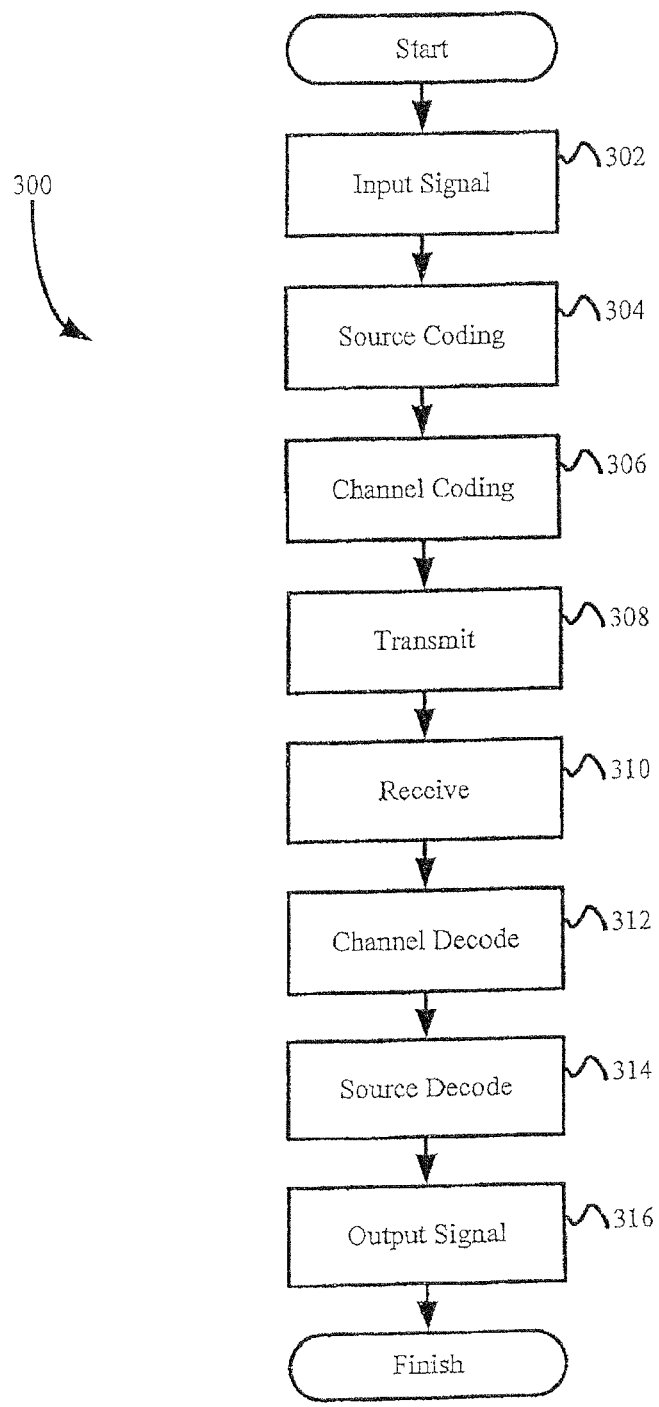

| Configuration | #0 | #1 | #2 | #3 | #4 | #5 | #6 | #7 |
|---|---|---|---|---|---|---|---|---|
| 1 | DL | DL | DL | GS | UL | UL | UL | GS |
| 2 | GS | DL | DL | DL | GS | UL | UL | UL |
| 3 | UL | GS | DL | DL | DL | GS | UL | UL |
| 4 | UL | UL | GS | DL | DL | DL | GS | UL |
| 5 | UL | UL | UL | GS | DL | DL | DL | GS |
| 6 | GS | UL | UL | UL | GS | DL | DL | DL |
| 7 | DL | GS | UL | UL | UL | GS | DL | DL |
| 8 | DL | DL | GS | UL | UL | UL | GS | DL |

FIG. 5A

| Configuration | #0 | #1 | #2 | #3 | #4 | #5 | #6 | #7 |
|---|---|---|---|---|---|---|---|---|
| A | UL | GS | UL | GS | DL | GS | DL | GS |
| B | DL | GS | GS | UL | UL | GS | GS | DL |
| C | GS | DL | GS | GS | GS | UL | GS | GS |
| D | GS | UL | GS | GS | GS | DL | GS | GS |
| E | GS | DL | DL | DL | DL | DL | GS | UL |
| F | GS | UL | UL | UL | UL | UL | GS | DL |
| G | UL | UL | GS | GS | DL | DL | DL | GS |
| H | GS | GS | GS | GS | GS | GS | GS | GS |
| ... | ... | ... | ... | ... | ... | ... | ... | ... |
| n | | | | | | | | |

FIG. 5B

ADAPTIVE OPERATIONAL FULL-DUPLEX AND HALF-DUPLEX FDD MODES IN WIRELESS NETWORKS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to methods and apparatus for flexible modes of operation in a transceiver.

2. Description of Related Technology

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

A current topic of interest is the further development of UMTS towards a mobile radio communication system optimized for packet data transmission through improved system capacity and spectral efficiency. In the context of 3GPP, the activities in this regard are summarized under the general term "LTE" (for Long Term Evolution). The aim is, among others, to increase the maximum net transmission rate significantly in future, namely to speeds on the order of 300 Mbps in the downlink transmission direction and 75 Mbps in the uplink transmission direction. To improve transmission over the air interface to meet these increased transmission rates, new techniques have been specified.

The current LTE specification describes several multiple access methods. For the downlink transmission direction, OFDMA (Orthogonal Frequency Division Multiple Access) in combination with TDMA (Time Division Multiple Access) will be used. Uplink data transmission is based on SC-FDMA (Single Carrier Frequency Division Multiple Access) in combination with TDMA. Further, LTE is expected to support full-duplex FDD, half-duplex FDD and TDD (time division duplexing).

FIG. 1A illustrates the aforementioned full-duplex FDD, half-duplex FDD and TDD according to the prior art. Full-duplex FDD uses two separate frequency bands for uplink 122 and downlink 120 transmissions, and both transmissions can occur simultaneously. Unfortunately, full-duplex operation has a fixed amount of bandwidth (typically symmetrically divided between uplink 122 and downlink 120) allocated for data streams. Dynamically changing loads on the uplink 122 and downlink 120 data streams waste spectral resources; even during periods of low data rate, the bandwidth must remain assigned.

Furthermore, full-duplex FDD requires a duplex filter in order to separate the received waveform from the transmitted waveform. This duplex filter is "expensive" in terms of battery consumption, power amplifier cost and radio frequency sensitivity, especially when viewed from the perspective of a UE (e.g., mobile device or handset) manufacturer.

Unlike FDD, TDD uses the same frequency band for transmission in both uplink 122 and downlink 120. Within a given time frame, the direction of transmission is switched alternatively between the downlink 120 and uplink 122. TDD systems have the benefit that receive and transmit are not necessarily scheduled symmetrically, and can support uplink/downlink data variation more flexibly than Full-Duplex FDD. Furthermore, TDD operation does not require a duplex filter because receive and transmit are on the same frequency band. The primary challenge for time-divided systems such as TDMA and TDD is the isolation of one time slot from another, necessary to minimize interference. Timing management is handled by shifting transmission time to match the required time of arrival. The 3GPP has standardized a variable timing advance (TA) to control time synchronization between UE and base stations. Within a time slot, the amount of time necessary to maintain isolation is wasted as it cannot be used for data transmission/reception, therefore lower switching rates are desirable.

Half duplex FDD uses two separate frequency bands for uplink 122 and downlink 120 transmissions, similar to full-duplex FDD, but uplink and downlink transmissions are non-overlapping in time. The main benefit of half duplex FDD compared to full-duplex FDD is that the FDD duplex filter can be replaced by a relatively simple switch for transmit/receive separation. Unfortunately, half-duplex FDD operation must be scheduled in the same manner as a time-divided (e.g., TDD) system. Furthermore, half-duplex FDD suffers from spectral inefficiency due to incomplete frequency band usage (only one of the uplink 122 or downlink 120 bands is active for a UE at any given point). However the advantages of half-duplex FDD operation, as viewed from an operational standpoint of the base station, include allowing multiple UEs to time-share uplink and downlink resources. Accordingly, half-duplex FDD operation can be implemented on FDD networks for managing large groups of asymmetric data requirements, in a manner similar to TDD networks.

Half-duplex FDD operation in LTE systems is further described in Tdoc R1-080598, "Way forward for half duplex", Ericsson et al., 14-18 Jan. 2008, and Tdoc R1-080534, "Half Duplex FDD in LTE", Ericsson, Nokia, Nokia Siemens Networks, 14-18 Jan. 2008, each of which is incorporated herein by reference in its entirety. In current implementations of half duplex operation in LTE networks, subframes are assigned to a UE for uplink or downlink transmission as a result of the scheduler operation in eNodeB. The eNodeB scheduler ensures that a UE is not transmitting and receiving in the same subframe. Accordingly, the UE is typically prepared to receive downlink (DL) transmissions in all subframes, and uplink (UL) transmissions are explicitly assigned through what is known as a scheduling grant.

Due to the TDMA component of the LTE multiple access schemes in the UL and DL, so-called timing advance (TA) adjustments for the uplink transmissions are utilized. These adjustments are implemented using a signal from a UE that arrives at the base transceiver station according to the determined frame/subframe timing, so that it does not interfere with the transmission of other UEs. A timing advance value corresponds to the length of time a UE has to advance its timing of UL transmission, and is sent by the eNodeB to the UE according to the perceived propagation delay of UL transmissions.

FIG. 1B is a detail of the prior art half duplex scheme shown in FIG. 1A, with a chronology of the uplink and downlink transmissions labeled 130, 132, and 134. As shown, the current proposal for implementation of a DL-UL switch specifies that, for a UE receiving in sub-frame n 130 and transmitting on sub-frame n+1 134, a reserved period 136 for UE switching between receive and transmit shall be provided at the end of the downlink sub-frame 130 preceding the sub-frame 134 in which the UE is required to transmit. In a subframe 130 allocated for DL transmission directly before an UL transmission is due, the time available for the actual data transmission is thus reduced by the period 136 for switching from DL to UL and by the necessary TA. In conditions with rising TA, the TA will reduce the effective DL transmission time in this subframe significantly. A drawback of this approach is that resources cannot be allocated to other UEs during the times of no DL transmission due to the TA and switching.

Similarly, for the UL-DL switch, a reserved period for UE switching between transmit and receive is provided by timing advance means for the UE transmitting in subframe n 134 and receiving in subframe n+1 132. As the TA affects the transmission in subframe n 134 to stop before the boundary of the subframe 132, the switching period 138 can effectively use the TA, and increasing TA will not negatively impact the UL transmission efficiency.

The current working assumption is that a UE operating in an LTE radio cell will operate either in a full-duplex or a half-duplex FDD mode. Several solutions have been contemplated in the prior art to allow for both full-duplex and half-duplex operation in wireless transmission systems. For example, U.S. Pat. No. 6,665,276 to Culbertson, et al. issued Dec. 16, 2003 and entitled "Full duplex transceiver" discloses an RF front end to an IF generator and post-processor whereby the IF generator output is variable. The transceiver up-conversion path includes an IF Filter, the output of which is input to a mixer with the output of a fixed Phase Locked Oscillator (PLO). The mixer output is input to a band-pass filter and amplified. With a single antenna configuration, the amplifier output connects to either an internal or external diplexer that interfaces to the antenna. With a dual antenna configuration, the amplifier output interfaces directly to the antenna. Similarly, the down-conversion path includes an internal or external diplexer in the single antenna configuration, a band-pass filter, a RF amplifier, a mixer that receives the RF amplifier output and the fixed PLO as inputs, an IF Filter, IF amplifier, and an attenuator for interfacing to the IF post-processor. A user-interface allows RF TX and RX frequency selection, data rate selection, and configurable options including internal or external diplexer, internal or external oscillator reference, and TX amplifier keying to allow simplex, half duplex, or full duplex communication.

U.S. Pat. No. 7,197,022 to Stanwood, et al. issued Mar. 27, 2007 and entitled "Framing for an adaptive modulation communication system" discloses a system and method for mapping a combined frequency division duplexing (FDD) Time Division Multiplexing (TDM)/Time Division Multiple Access (TDMA) downlink subframe for use with half-duplex and full-duplex terminals in a communication system. Embodiments of the downlink subframe vary Forward Error Correction (FEC) types for a given modulation scheme as well as support the implementation of a smart antennae at a base station in the communication system. Embodiments of the system are also used in a TDD communication system to support the implementation of smart antennae. A scheduling algorithm allows TDM and TDMA portions of a downlink to efficiently co-exist in the same downlink subframe and simultaneously support full and half-duplex terminals. The algorithm further allows the TDM of multiple terminals in a TDMA burst to minimize the number of map entries in a downlink map. The algorithm limits the number of downlink map entries to not exceed 2n+1, where n is the number of DL PRY modes (modulation/FEC combinations) employed by the communication system.

U.S. Pat. No. 7,339,926 to Stanwood, et al. issued Mar. 4, 2008 and entitled "System and method for wireless communication in a frequency division duplexing region" discloses a method and system for using half-duplex base stations and half-duplex nodes in a Frequency Division Duplexing region to provide wireless connectivity between the half-duplex base stations and customers in multiple sectors of a cell. The method and system can use two physical channels to form two logical channels. Each logical channel shares both physical channels during alternating frames of time. The half-duplex nodes can include a millimeter-wave band frequency synthesizer configured to transmit and receive on different channels to and from the half-duplex base station. Re-use patterns of the physical channels are used for deployment of half-duplex base stations and half-duplex nodes in the FDD region to minimize co-channel interference and interference due to uncorrelated rain fade. Additional methods and systems utilize full-duplex base stations and smart antenna to communicate with the half-duplex nodes.

United States Patent Publication No. 20070054625 to Beale published Mar. 8, 2007 and entitled "Compatible broadcast downlink and unicast uplink interference reduction for a wireless communication system" discloses embodiments that reduce interference from a mobile station (UE) uplink transmission to a received broadcast downlink transmission through a network-based scheduling of time-slotted downlink broadcast transmissions, so that they do not occur concurrently with uplink transmissions. UEs are designed and built to use: (i) downlink broadcast transmissions that are time-slotted; (ii) UEs operate either in half-duplex mode for transmission and reception of unicast services, or in full duplex mode where additional bandpass or additional highpass filtering can be applied to the DL unicast carrier; (iii) when unicast services are active for a UE, the UE informs the network of the broadcast services that are being decoded; and (iv) the network schedules unicast transmissions, broadcast transmissions, or both unicast and broadcast transmissions such that the uplink unicast transmission to a UE is never time-coincident with the broadcast transmissions to that UE.

Despite the foregoing, the prior art fails to provide an adequate solution for dynamic switching capability between full-duplex and half-duplex operation in wireless transmission systems (such as cellular networks), such that the respective advantages of both modes can appropriately be utilized. Therefore, improved apparatus and methods for the adaptive operation of full-duplex and half-duplex FDD modes in a cellular system such as LTE is needed.

Such apparatus and methods would also ideally include a UE that may support both FDD modes, so that it can be adaptively switched between full-duplex and half duplex FDD operation, rather than statically assigning modes of operation. In addition, it would advantageously further support additional modes of operation for half-duplex operation, and allow a UE to operate in a battery-efficient half duplex FDD mode as well as improve cellular data throughput.

Further, such improved apparatus and methods would allow the network to opt to switch the UE transceiver mode to optimize data scheduling as well as network resource utilization.

SUMMARY OF THE INVENTION

The present invention satisfies the aforementioned needs by providing improved apparatus and methods for adaptive duplex operation.

In one aspect of the invention, a method of switching duplex operation in a wireless network is disclosed. In one embodiment, the wireless network comprises a plurality of networking devices, and the method comprises: operating the network in a first duplexing mode; detecting a trigger event within at least one of the plurality of networking devices operating in the first duplexing mode; determining a second duplexing mode of operation based at least in part on the detection of the trigger event; distributing information about the change from the first duplexing mode to the second duplexing mode to at least a portion of the plurality of networking devices; and operating the networking devices in the second duplexing mode.

In one variant, the first duplexing mode comprises a default mode of operation for the network.

In another variant, the plurality of networking devices further comprises a serving station and a plurality of mobile stations. The serving station may broadcasts the default mode of operation to the plurality of mobile stations.

In a further variant, the first duplexing mode comprises a half-duplex FDD mode of operation and the second duplexing mode comprises a full-duplex FDD mode of operation.

In still another variant, the trigger event is detected at a radio resource control (RRC) unit within the wireless network. The trigger event may comprise for example reaching a threshold value in a timing advance (TA) value. The threshold value may be for instance indicative of a change in quality of service for the wireless network.

In a further variant, the trigger event comprises a higher quality of service request than the first duplexing mode can provide, and the first duplexing mode comprises a half-duplex FDD mode of operation, and the second duplexing mode comprises a full-duplex FDD mode of operation.

In another variant, the trigger event is related to a battery status of at least one of the plurality of mobile stations within the network.

Alternatively, the trigger event is selected from the group consisting of: timing advance variables in the network, data rates in the network; and battery status of at least a portion of the networking devices.

In still another variant, the first duplexing mode comprises a half-duplex FDD mode of operation and the second duplexing mode comprises a full-duplex FDD mode of operation; and the trigger event comprises a rising timing advance (TA) value.

Alternatively, the first duplexing mode comprises a full-duplex FDD mode of operation and the second duplexing mode comprises a half-duplex FDD mode of operation; and the trigger event comprises a falling timing advance (TA) value.

In yet a further variant, the first duplexing mode comprises a dynamic half-duplex FDD mode of operation and the second duplexing mode comprises a semi-static half-duplex FDD mode of operation; and the trigger event comprises a rising timing advance (TA) value.

Alternatively, the first duplexing mode comprises a semi-static half-duplex FDD mode of operation, and the second duplexing mode comprises a dynamic half-duplex FDD mode of operation; and the trigger event comprises a falling timing advance (TA) value.

In a second aspect of the invention, a client device capable of operating in a plurality of duplexing modes on a wireless network is disclosed. In one embodiment, the client device comprises: a processing device coupled to a memory; a radio/modem subsystem coupled to the processing device; and a computer program resident within the memory that when executed by the processing device, executes the method comprising: signaling a duplex component, directly or indirectly, resident within the client device to operate in a first duplexing mode of operation; and substantially in response to a detected trigger event, signaling the duplex component to operate in a second duplexing mode of operation.

In one variant, the first duplexing mode comprises a default mode of operation for the wireless network, and a serving station broadcasts to the client device information invoking the default mode of operation, the signaling a duplex component being substantially in response to the serving station broadcast.

In another variant, the first duplexing mode comprises a half-duplex FDD mode of operation, and the second duplexing mode comprises a full-duplex FDD mode of operation, and the trigger event is detected at a radio resource control (RRC) unit within the wireless network and signaled to the radio/modem subsystem of the client device. The trigger event may comprise for example reaching a threshold value in a timing advance (TA) value, and/or may be indicative of a change in quality of service for the wireless network. Alternatively, the trigger event comprises a higher quality of service (QoS) level than the first duplexing mode can provide.

In another variant, the client device further comprise a battery, wherein the trigger event is related to a charge or energy status of the battery.

In a further variant, the first duplexing mode comprises a half-duplex FDD mode of operation and the second duplexing mode comprises a full-duplex FDD mode of operation; and the trigger event comprises a rising timing advance (TA) value. Alternatively, the first duplexing mode comprises a full-duplex FDD mode of operation and the second duplexing mode comprises a half-duplex FDD mode of operation; and the trigger event comprises a falling timing advance (TA) value. As yet another alternative, the second duplexing mode comprises a semi-static half-duplex mode of operation.

As yet another alternative, the first duplexing mode comprises a dynamic half-duplex FDD mode of operation, and the second duplexing mode comprises a semi-static half-duplex FDD mode of operation; and the trigger event comprises a rising timing advance (TA) value.

Alternatively, the first duplexing mode comprises a semi-static half-duplex FDD mode of operation, and the second duplexing mode comprises a dynamic half-duplex FDD mode of operation; and the trigger event comprises a falling timing advance (TA) value.

In a third aspect of the invention, a method of operating a serving station resident within a wireless network is disclosed. In one embodiment, the serving station further comprising a logical connection to a client device, and the method comprises: broadcasting a default duplexing mode of operation to the wireless network; detecting a trigger event associated with the wireless network; determining that a different duplexing mode of operation would benefit the wireless network; and signaling the client device to operate in the different duplexing mode of operation.

In one variant, the default duplexing mode comprises a half-duplex FDD mode of operation, and the different duplexing mode comprises a full-duplex FDD mode of operation. The trigger event is detected at e.g., a radio resource control (RRC) unit within the serving station, and comprises reaching a threshold value in a timing advance (TA) value. The threshold value is indicative of a for instance change in quality of service for the wireless network.

In another variant, the trigger event comprises a higher quality of service level than the default duplexing mode can provide. The default duplexing mode comprises a half-duplex FDD mode of operation, and the different duplexing mode comprises a full-duplex FDD mode of operation.

Alternatively, the default duplexing mode comprises a half-duplex FDD mode of operation, and the different duplexing mode comprises a full-duplex FDD mode of operation; and the trigger event comprises a rising timing advance (TA) value.

As yet another alternative, the default duplexing mode comprises a full-duplex FDD mode of operation, and the different duplexing mode comprises a half-duplex FDD mode of operation; and the trigger event comprises a falling timing advance (TA) value.

Alternatively, the default duplexing mode comprises a dynamic half-duplex FDD mode of operation, and the different duplexing mode comprises a semi-static half-duplex FDD mode of operation, and the trigger event comprises a rising timing advance (TA) value.

As yet another alternative, the default duplexing mode comprises a semi-static half-duplex FDD mode of operation, and the different duplexing mode comprises a dynamic half-duplex FDD mode of operation; and the trigger event comprises a falling timing advance (TA) value.

In an alternate variant, the network utilizes hybrid ARQ (HARQ) processing, and the serving station; identifies the use of the HARQ processing; and implements only a subset of available duplex modes based at least in part on the identifying. The serving station may also communicate configuration information to the client device regarding the subset.

In a fourth aspect of the invention, a wireless base station adapted for multiple duplex modes of operation is disclosed. In one embodiment, the base station comprises a computerized device having a processor, memory and at least one computer program adapted to implement dynamic duplex mode switching as part of at least one of uplink or downlink communications with a UE in a UMTS network.

In a fifth aspect of the invention, a computer-readable apparatus is disclosed. In one embodiment, the apparatus comprises a storage medium adapted to store at least one computer program, the at least one program being adapted to cause a client device (e.g., UMTS UE) to operate in a default duplexing mode of operation; detect a trigger event associated with the wireless network; determining that a different duplexing mode of operation would benefit the wireless network; and signaling the client device to operate in the different duplexing mode of operation. In one variant, the apparatus comprises a hard disk drive (HDD) of a computerized system. In another variant, the apparatus comprises a flash or other comparable memory.

In a sixth aspect of the invention, a digital communications system adapted for dynamic duplex operation is disclosed. In one embodiment, the system comprises a UMTS wireless cellular system having a E-UTRAN with eNodeB, and at least one UE in wireless communication with the eNodeB. The system is optimized for at least one of spectral efficiency and battery power conservation in the UE through selective application of the aforementioned dynamic duplex mode switching.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 3 is a logical flow diagram illustrating an exemplary communication flow diagram for a simple prior art digital communications system.

FIG. 5A is a tabular representation illustrating an exemplary periodic UL-DL transmission pattern table of cyclically shifted transmission cycles for a semi-static half-duplex FDD mode of operation in accordance with the principles of the present invention.

FIG. 5B is a tabular representation illustrating an exemplary periodic UL-DL transmission pattern table of non-cyclically shifted transmission cycles for a semi-static half-duplex FDD mode of operation in accordance with invention.

DETAILED DESCRIPTION OF THE INVENTION

Figure 1A:
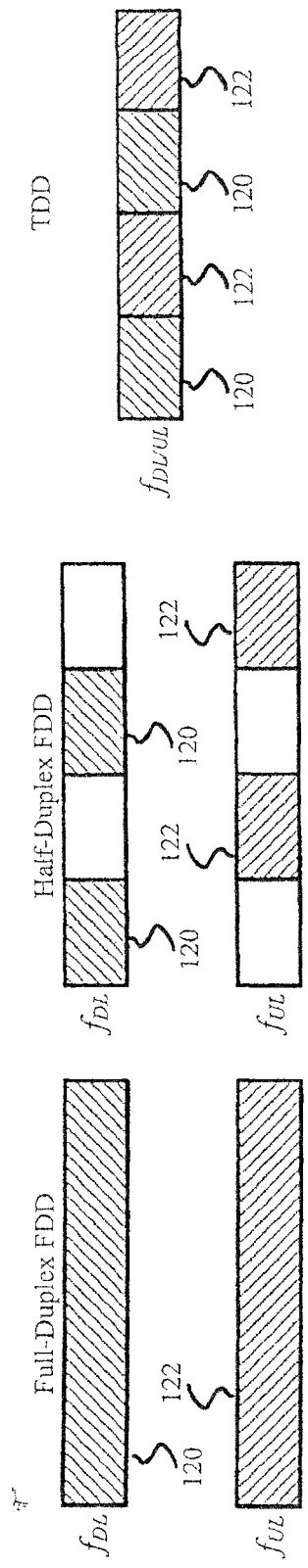
FIG. 1A is a graphical representation of various prior art duplex methods including full-duplex FDD, half-duplex FDD and TDD.
Figure 1B:
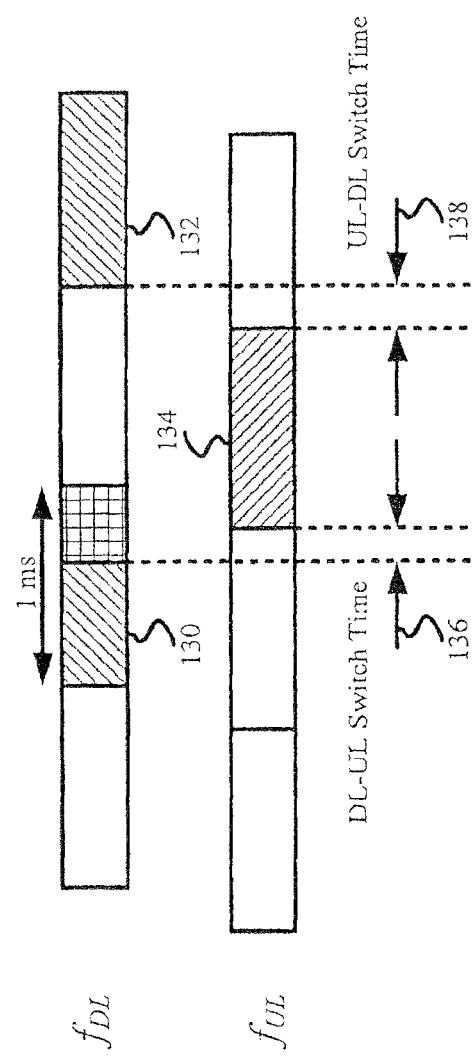
FIG. 1B is a graphical representation of DL-UL and UL-DL switching times for a half-duplex FDD operating mode in an exemplary prior art UMTS wireless system.

As used herein, the terms "client device", "end user device" and "UE" include, but are not limited to cellular telephones, smartphones (such as for example an iPhone™) personal computers (PCs), such as for example an iMac™, Mac Pro™, Mac Minim or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

As used herein, the terms "network interface" or "interface" typically refer to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAN), Ultra-ATA/DMA, Coaxsys (e.g., TVnet™), radio frequency tuner (e.g., in-band or GOB, cable modem, etc.), WiFi (802.11a,b,g,n), WiMAX (802.16), PAN (802.15), IrDA or other wireless families.

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one fundamental aspect, the present invention provides, inter alia, methods and apparatus that enable an FDD system to dynamically change between full-duplex operation and half-duplex operation in order to, inter alia, take advantage of operational aspects of both modes at appropriate times while minimizing any drawbacks associated therewith. These advantages include, for example, the flexible and dynamic switching between options based on actual network conditions, reduction in transceiver power consumption on the UE, as well as improvements in spectral resource usage/efficiency.

In one embodiment, the UE operates in a first mode according to a default network setting (or some other UE or network parameter). The network (and/or UE) then detects a trigger event, and determines a secondary mode of operation that would benefit the UE and/or network in one or more of the foregoing aspects. Auer deciding on a secondary mode of operation, information about the changes to be made are distributed onto the network so that other aspects of the network affected by the change are kept informed. The UE devices on the network are allocated spectral resources according to the second mode of operation, and subsequently operate according to the changes made to the network.

In another aspect of the invention, an alternative duplex mode of operation (so-called "semi-static half-duplex" operation) is provided. Such semi-static half-duplex operation advantageously enables coordination between the UE and the base station. In one embodiment, the semi-static half-duplex operation centralizes control of radio resources to the base station, enabling the base station to schedule UE access over guard slots, to further compact UE access to the network and enhance efficiency. It may also be used in a stand-alone fashion, or in conjunction with the aforementioned operational dynamic switching.

DETAILED DESCRIPTION OF EXEMPLARY EMBODIMENTS

Exemplary embodiments of the present invention are now described in detail. While these embodiments are primarily discussed in the context of a UMTS wireless network, and more specifically to fourth generation UMTS LTE networks, it will be recognized by those of ordinary skill that the present invention is not so limited. In fact, the various aspects of the invention are useful in any wireless network that can benefit from the dynamic switching of operational modes between transceivers as is disclosed herein, such as for example those compliant with the 3GPP2 initiative and standards, or IEEE 802.16 (WiMAX) systems. Moreover, while discussed primarily in the context of dynamic switching of full-duplex FDD to half-duplex FDD transceiver modes, it is recognized that other transceiver capabilities may be implemented without departing from the principles of the present invention described herein.

As is well known, a cellular radio system comprises a network of radio cells each served by a transmitting station, known as a cell site or base station. The radio network provides wireless communications service for a plurality of transceivers (in most cases mobile). The network of base stations working in collaboration allows for wireless service which is greater than the radio coverage provided by a single serving base station. The individual base stations are connected by another network (in many cases a wired network), which includes additional controllers for resource management and in some cases access to other network systems (such as the Internet) or MANs.

Figure 2A:
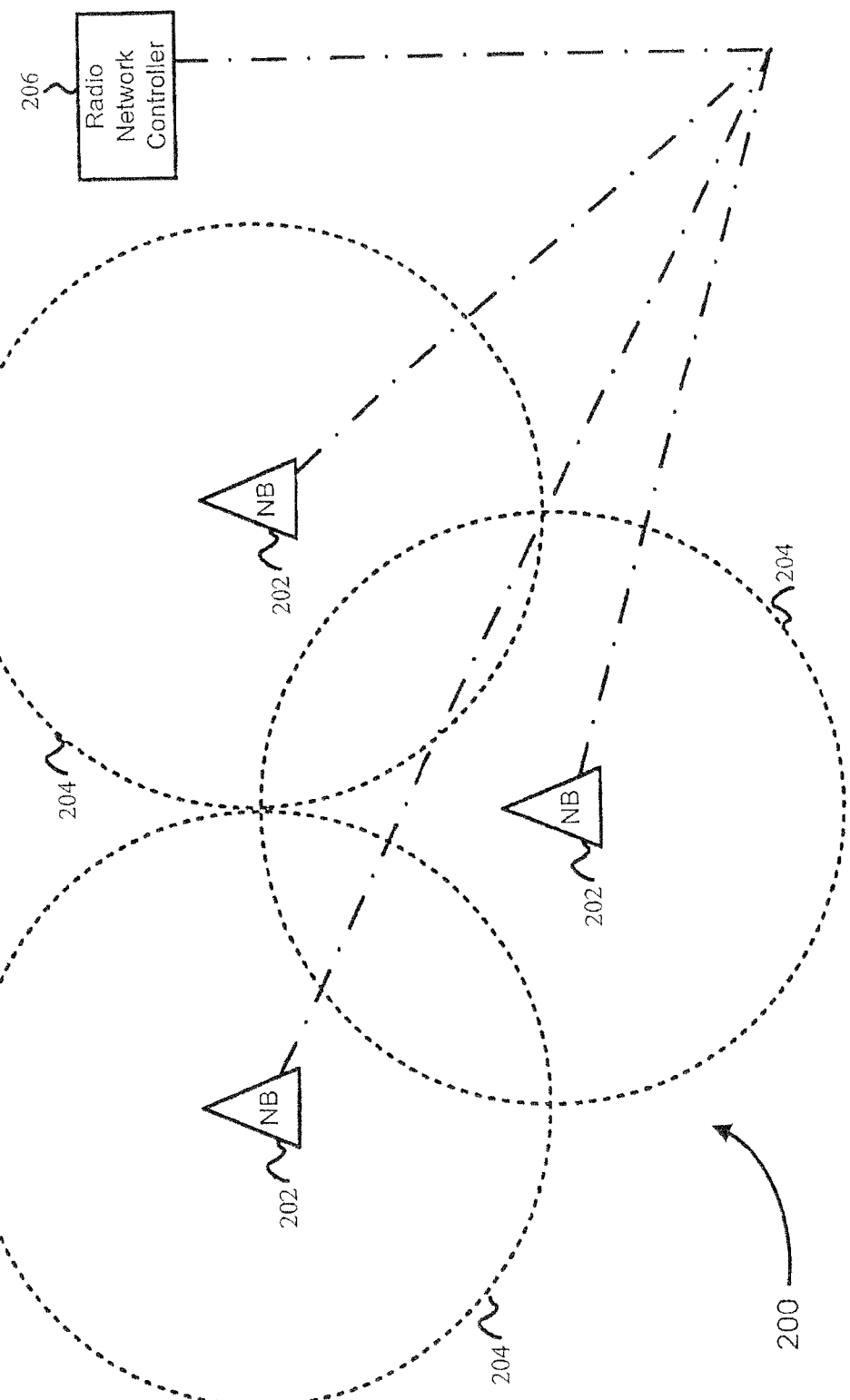
FIG. 2A is a functional block diagram of an exemplary embodiment of a prior art UMTS cellular system.

In a UMTS system, a base station is commonly referred to as a "Node B". The UMTS Terrestrial Radio Access Network (UTRAN) is the collective body of Node Bs along with the UMTS Radio Network Controllers (RNC). The user interfaces to the UTRAN via User Equipment (UE), which in many typical usage cases is a cellular phone or smartphone, FIG. 2A illustrates an exemplary UMTS cellular system 200 with focus on the radio network. The UMTS system 200 comprises a plurality of base station towers 202 (Node Bs) that are set at various fixed geographic locations. Each of these base station towers 202 are characterized by their respective wireless coverage areas 204. The radio network controller 206 generally governs the operation of the base station towers 202.

Figure 2B:
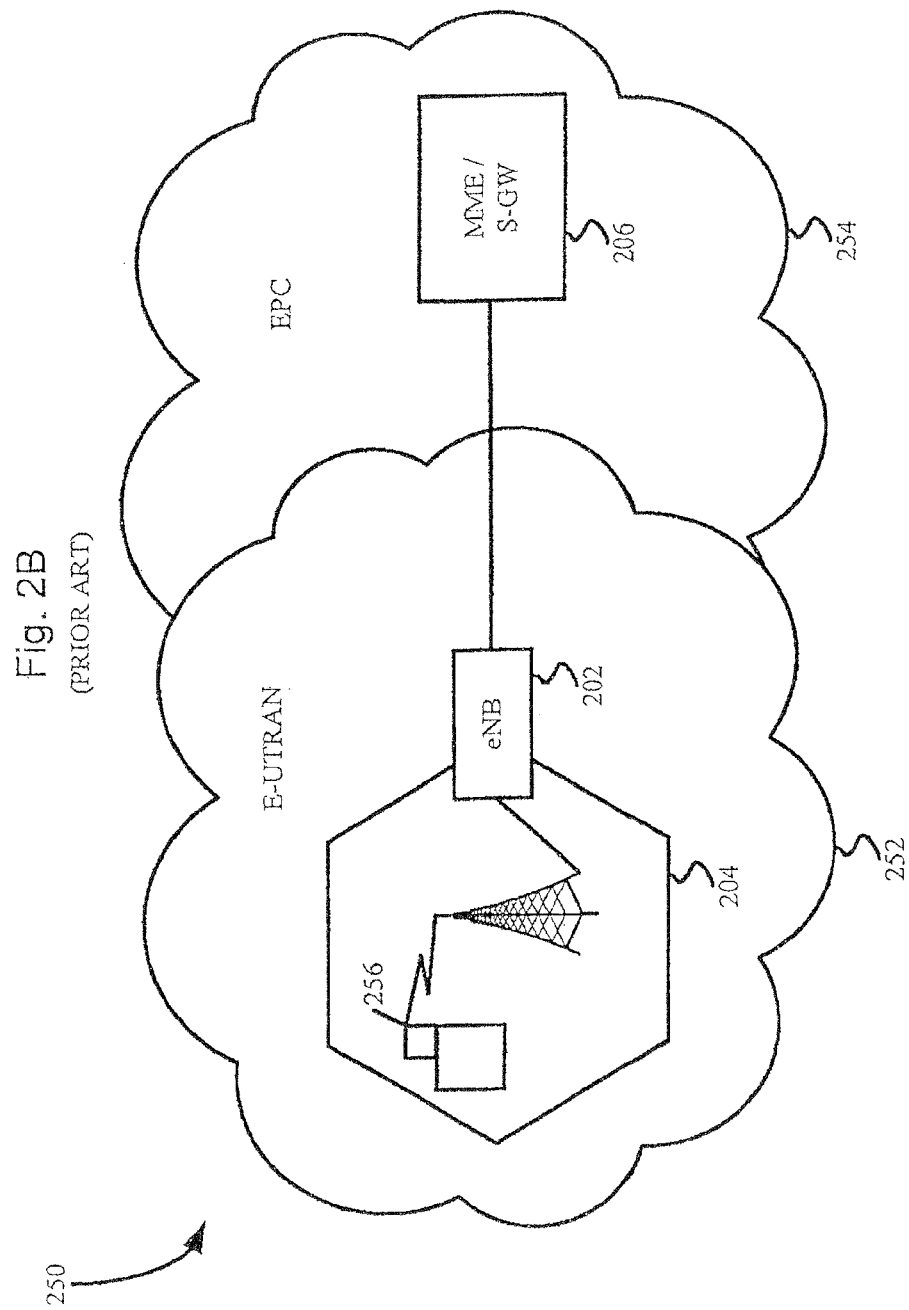
FIG. 2B is a functional block diagram of an exemplary prior art LTE network architecture.

FIG. 2B illustrates the high-level network architecture for the fourth generation successor to the GSM/UMTS standard, also known as LTE. As seen in FIG. 2B, an LTE 250 system comprises the radio access network E-UTRAN 252 (Evolved UMTS Terrestrial Radio Access Network) and the core network EPC 254 (Evolved Packet Core). The E-UTRAN 252 comprises a plurality of base transceiver stations known as eNodeB (eNBs) 202. Each eNB 202 provides radio coverage 204 for one or more mobile radio cells within E-UTRAN 252. Control and user data are transmitted between a respective eNB 202 and a UE 256 in a mobile radio cell 204 over the air interface on the basis of a multiple access method. For LTE, new multiple access methods have been specified. For the downlink transmission direction OFDMA (Orthogonal Frequency Division Multiple Access) in combination with TDMA (Time Division Multiple Access) is used. OFDMA in combination with TDMA, subsequently also called OFDMA/TDMA, is a multicarrier multiple access method in which a subscriber is provided with a defined number of subcarriers in the frequency spectrum, and a defined transmission time for the purpose of data transmission. Uplink data transmission is based on SC-FDMA (Single Carrier Frequency Division Multiple Access) in combination with TDMA.

The eNBs 202 are connected in the exemplary embodiment to the EPC 254 (Evolved Packet Core) which comprises the MME (Mobility Management Entity) and the Serving Gateway (S-GW) 206. The MME is responsible for controlling the mobility of UEs 256 located in the coverage area of E-UTRAN 204, while the S-GW is responsible for handling the transmission of user data between UE 256 and network. Details of the radio access network and air interface for LTE systems are described in, inter alia, 3GPP Technical Specification TS 36.300 entitled "E-UTRA and E-UTRAN; *Overall description; Stage* 2", which is incorporated herein by reference in its entirety.

FIG. 3 illustrates an exemplary communication flow 300 for a digital communication system such as the aforementioned UMTS system. The illustrated communication flow begins at step 302, where an input signal (e.g., an analog voice signal or the like) is converted into a digital representation. This digital data stream is compressed to reduce redundant or unnecessary information in a process collectively referred to as source coding 304, as is well known in the digital processing arts. The compressed data stream is coded so as to be resistant to noise in a process collectively referred to as channel coding 306. This may include for example forward error correction (FEC) coding such as convolutional codes, Turbo codes or LDPCs. The channel coded output is passed to a transmitter, and transmitted across a noisy medium 308 (e.g., air interface). The receiver receives an input data stream from the transmission medium 310, with an expected amount of corruption introduced by the noise. The received data is passed through a data correction process 312 using the channel decoding methods described above to correct for transmission errors. The corrected data stream is decompressed and re-assembled into a reproduction of the input signal 314 using the source decoding methods described above. Lastly, the output signal 316 is passed to higher layer software for use or distribution thereby.

In an UMTS-based system, the communication between Node B and UE operate in both uplink and downlink directions; i.e. both the Node B and the UE, transmit and receive. Uplink and downlink communications are commonly implemented using Frequency Division Duplex (FDD) and Time Division Duplex (TDD). FDD operation relies on separation between frequency bands to prevent interference between channels, while TDD relies on separation between time slots to prevent interference between channels.

Frame Structure for FDD in LTE Networks—

In UMTS, data streams are subdivided in time to constant time intervals, or frames. Each frame is further subdivided into slots, and subframes. Not all subframes need to be in use (the network could be underutilized), but a subframe is the smallest incremental amount of data to be used for transmission/reception with the transceivers. Once a transceiver has acquired the base station timing, subframes are allocated to each transceiver with a scheduling function.

Figure 4:
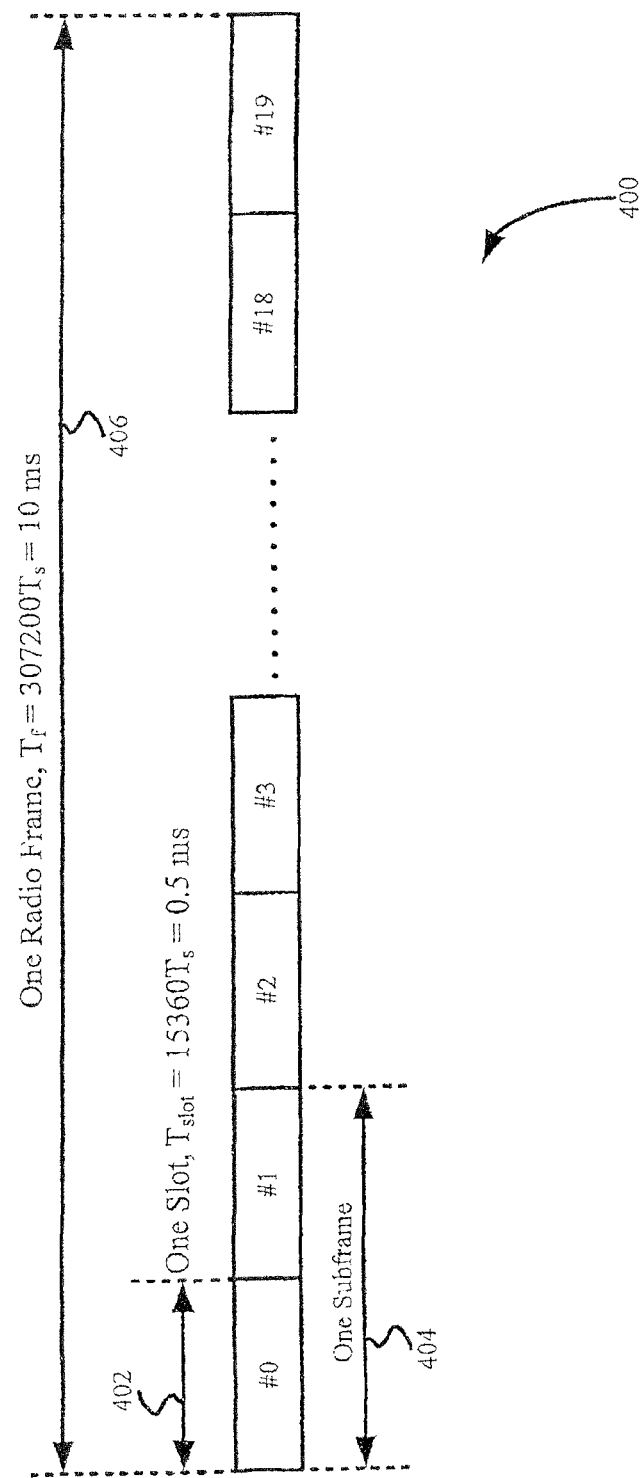
FIG. 4 is a graphical representation of an exemplary frame structure type for a prior art LTE FDD system.

An LTE network utilizes a standard frame structure type 1 400 (as shown in FIG. 4) which is used in both full-duplex and half-duplex FDD. Each radio frame 406 is ten (10) ms in duration, and consists of twenty (20) slots 402 in 0.5 ms length intervals, numbered from 0 to 19. A subframe 404 is defined as two consecutive slots 402. Ten (10) subframes 404 are available for downlink transmission, and ten (10) subframes 404 are available for uplink transmissions in each ten (10) ms interval. Uplink and downlink transmissions are separated in the frequency domain.

Hybrid ARQ (HARQ)—

In LTE, a Hybrid Automatic Repeat Request mechanism (i.e., the combination of channel coding and 8-channel Stop & Wait mechanism) is applied as a method for backward error correction for both full duplex FDD and half duplex FDD operation. Each transmission of data (control or user data in UL and DL) in a transport block in a subframe is positively or negatively acknowledged by the receiver by sending the information indicating whether a transport block has been successfully received or not. If successfully received, the sender is expected to send a new data block in the next related subframe; if it is not successfully received, the sender is expected to re-transmit the data block in the next related subframe.

For data blocks transmitted in the DL by the eNodeB, a fixed relationship in time between data transmission and acknowledgements and between acknowledgements and re-transmissions exist. After a DL transmission in subframe n, the UE is expected to acknowledge the DL data reception in the subframe n+4. After an UL transmission in subframe n, the eNodeB is expected to acknowledge the UL data reception in subframe n+4, and the UE is expected to re-transmit the data in case of unsuccessful reception in subframe n+8. Due to the time dependencies of HARQ processing, additional time requirements for half-duplex FDD are necessary.

Any half-duplex scheme applied for LTE has to ensure that transmissions in the UL and DL are carefully switched, so that for each transmission the related acknowledgements and re-transmissions can occur with the fixed time relation described. In other implementations of networks utilizing HARQ processing and half-duplex communication channels, the time requirements may substantially differ. Furthermore, while HARQ is considered a time constraint that is essential for LTE operation, other operations may require separate time constraints (e.g., real-time or QoS-related data demands well known to the arts such as streaming video), or no significant time constraints at all (e.g. trickle type, or swanning type downloads).

Radio Resource Control (RRC)—

In the exemplary implementation, the RRC of the UMTS WCDMA protocol stack handles the control plane signaling between the UEs and UTRAN, and (among other functions) must perform connection establishment and release. For the efficient control of radio resources and communication connection between a UE and eNodeB, two connection states of interest are specified in the RRC protocol layer (i.e. RRC_IDLE and RRC_CONNECTED) of the UMTS LTE protocol stack. See for example, 3GPP Technical Specification TS 36.331 entitled "E-UTRA Radio Resource Control (RRC)", incorporated herein by reference in its entirety. The RRC connection is defined as a point-to-point bidirectional connection between RRC peer entities in the LIE and eNodeB, respectively. In addition, there typically is either zero or one RRC connection between a UE and eNodeB.

In the RRC_IDLE state discussed above, no RRC connection between the UE and UTRAN has been established. During the RRC_IDLE state, the UE performs a variety of functions necessary for radio link management, such as cell selection/reselection, monitoring the paging channel, and acquiring system information broadcast in the radio cell. In this state, the UTRAN may maintain the UE position, known by the network at a "tracking area" level. A tracking area defines a group of cells where the UE in RRC_IDLE state registers, and where the UE is paged in ease of an incoming communication attempt. During RRC_IDLE operation, there is no transmission of user and control data in either uplink or downlink.

In the RRC_CONNECTED state, an RRC connection is established, and the UE and UTRAN must actively handle radio resource allocations. Network controlled mobility is performed by explicit handover and cell change order. The UTRAN must maintain/update UE position, at the cell area level. The UE acquires system information which is broadcast in the radio cell. Transmission of user and control data in uplink and downlink occurs during the RRC_CONNECTED state. The RRC protocol layer is responsible for broadcasting system level information, and for maintaining connection layer bi-directional control.

Semi-Static Half-Duplex FDD Mode—

In one embodiment of the invention, an alternate half-duplex FDD mode, referred to as semi-static half-duplex FDD mode, is provided. The exemplary implementation of this semi-static half-duplex FDD mode is characterized by periodic UL-DL transmission patterns, although it will be recognized that a periodic UL-DL transmissions may be practiced as well. In one variant, a periodic UL-DL transmission pattern with an infinite length is specified.

Each periodic transmission pattern consists of a number of UL and DL subframes, as well as Guard Subframes (GS) where no transmissions take place. In one variant, allocating the guard subframes to a UE between DL and UL transmission subframes allows the UE to perform DL/UL switching. Advantageously, the radio resources in that Guard Subframe can be allocated to different users (e.g., UEs) in the network. Further, the periodic transmission pattern can be adapted so that switching cannot occur in a time interval that violates the UL and DL HARQ requirements.

In semi-static half-duplex FDD mode operation, certain constraints on transmission patterns may be implemented to improve radio resource usage. For example, the length of a given periodic transmission pattern is N subframes. Configuration of transmission patterns (in terms of number and length) is either system-wide (i.e. applicable to all LTE cells of an operator) or cell-specific (i.e. applicable only to a given LTE cell), The transmission pattern configuration comprises a set of base transmission patterns and a set of cyclic shifted versions of that base transmission pattern. Additionally the transmission patterns allocated to some UEs in a cell can be applied in parallel with UEs operating in dynamic half-duplex FDD mode as well as in full-duplex FDD mode as well.

FIG. 5A illustrates a first exemplary embodiment of a periodic UL-DL transmission pattern in accordance with the principles of the present invention. In the embodiment of FIG. 5A, eight (8) configurations are shown for a length comprising eight (8) subframes. Each configuration consists of three (3) DL subframes; three (3) UL subframes and a Guard Subframe (GS) between the UL and DL subframes. Each configuration comprises a unique configuration where the UL and DL subframes are placed sequentially within the overall frame structure. This minimizes the amount of GS needed which is desirable as GS comprise a dead period where no transmissions take place. Further, the periodic cycling between DL and UL every four (4) subframes ensures compliance with UL and DL HARQ requirements.

While FIG. 5A illustrates cyclical shifted semi-static scheduling, it is appreciated that the scheduling may comprise non-cyclical scheduling as well. For example, FIG. 5B illustrates an exemplary embodiment of a non-cyclical shifted semi static scheduling table (note that the configurations of FIG. 5B have been lettered rather than numbered for sake of clarity). As can be seen in FIG. 5B, shifting does not occur between configurations. Furthermore, as demonstrated in FIG. 5B, when non-sequential sets are defined, a much larger number of permutations are possible, which advantageously satisfy varying data rate requirements. Cyclically shifted configurations are easier to calculate, and simpler to implement, however for certain data rates, and data requirements, other formats may be used.

With reference to configurations A, B, C, and D (FIG. 5B); configurations A and B can be assigned to two users who require twice the resources of the two users assigned configurations C and D. In these configurations, HARQ timing is obeyed.

With reference to configurations E and F, these configurations would only be possible for systems which can selectively enable and disable HARQ operation. Even though HARQ operation is disabled, at least one uplink and one downlink frame must exist, so as to enable the UE to signal to the eNB that the transmission is completed, or vice versa. Certain data configurations do not depend on perfect data fidelity, but are time dependent (such as MPEG encode/decode operations); for such applications, disabling HARQ operation may be reasonable. By removing the HARQ requirement for configurations A, B, C, and D even more flexible options for data service are possible.

With reference td configuration G, an asymmetric data load can be supported. This configuration could be helpful for inter alia a multi-streamed connection to a UE with one stream requiring data integrity (HARQ operation), and another stream which is allowably "lossy". Such a case could occur during simultaneous file transfer, and real-time MPEG streaming.

With reference to configuration H, neither uplink nor downlink activity is signaled. This configuration can only be signaled to the UE if the UE has the ability to "wake up" at a later point in time. Such methods of discontinuous transfer (DTX/DRX) are already well known to the arts, and may be useful in the context of the communication system described herein as well.

Alternative configurations provide enhanced operational flexibility depending on the resource requirements for the network, but come at a higher software cost, and increase the complexity of both the UE and eNB communication.

For the semi-static half-duplex FDD mode of operation, eight (8) periodic transmission patterns are configured in the cell, as described subsequently herein with respect to FIG. 5A.

Methods—

Figure 6:
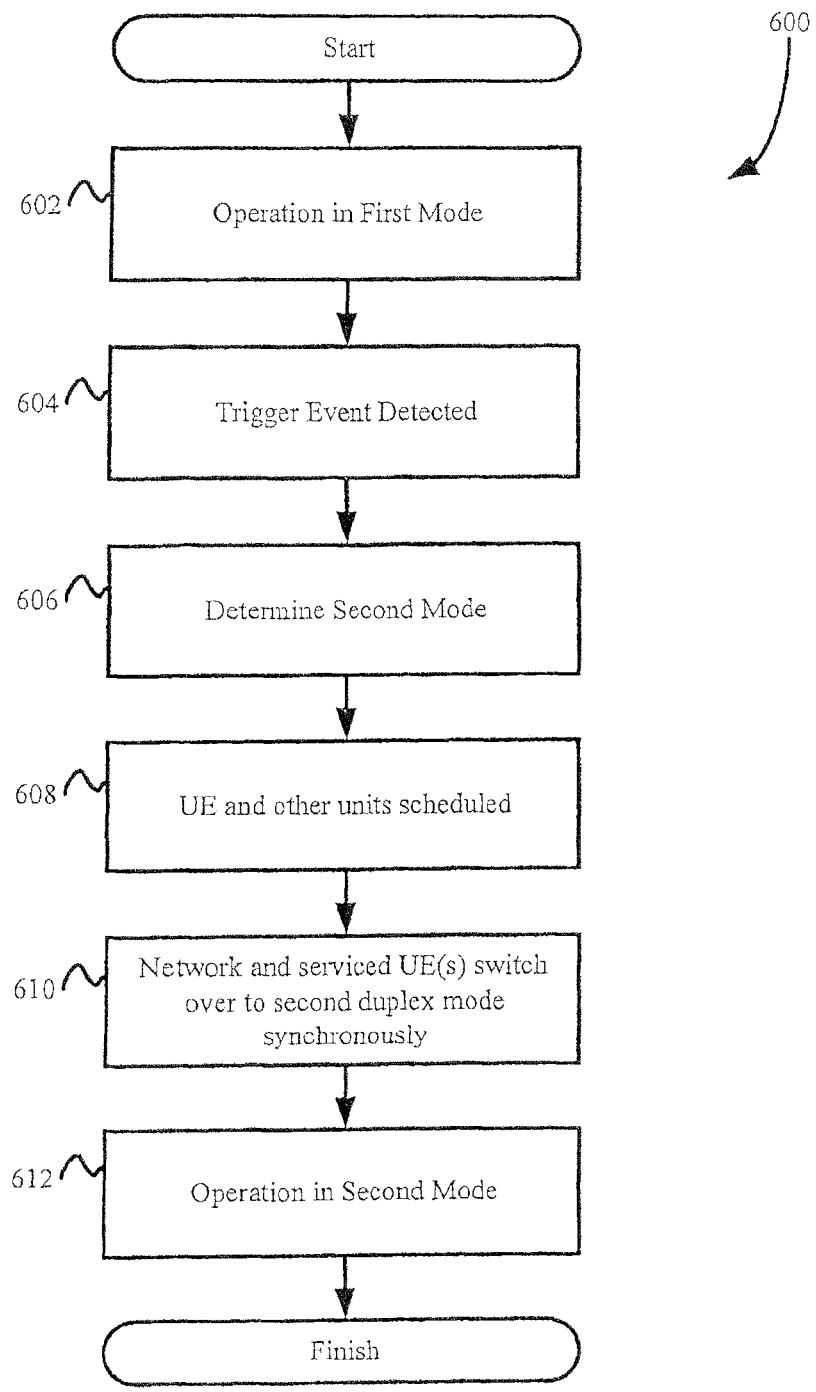
FIG. 6 is a logical flow diagram of an exemplary embodiment of the switching process for changing duplex modes in accordance with the invention.

Referring now to FIG. 6, a first exemplary process 600 for dynamically switching between full-duplex FDD and half-duplex FDD operation according to the present invention is described. It will be appreciated that while the process of FIG. 6 is described in the context of an LTE UMTS system, it may be applied generally to other types of systems.

At step 602, the eNB and one or more UEs begin operating in a first duplex mode (e.g., full-duplex, dynamic half-duplex or semi-static half-duplex). In one embodiment of the exemplary process 600, the UE supports multiple FDD modes and selects one of the supported modes after the UE switches-on. The UE may then operate in a mode based on for example the default settings specified by the network operator. In a variant of the first embodiment, the UE may decide to operate in full-duplex or half-duplex FDD mode based on implementation-specific details; e.g. depending on the battery status at the UE side, network information received from the network, etc.

In one variant, the network signals its support of available modes to the radio network (e.g., the supported FDD modes in the radio cell), which is then broadcast or otherwise sent to all UEs in the cell. For example, if the radio cell on which the UE is camped only supports one of the FDD modes (e.g. full-duplex FDD), the UE changes its selected FDD mode after switch-on accordingly.

In another variant, if the radio cell on which the UE is camped does support multiple modes, explicit signaling is utilized between the UE and the eNB so that the UE knows which mode it should be operating in. Various other logical constructs or procedures for selecting an appropriate mode at startup will be recognized by those of ordinary skill given the present disclosure, and accordingly are not described further herein.

At step 604, a trigger event is detected either at the eNB or the UEs. In the exemplary embodiment, these trigger events comprise pre-defined events, monitored by the eNB or UE, which are indicative of an opportunity to optimize or simply modify the current transceiver operation. In one variant, the switch between full-duplex FDD mode and half-duplex FDD mode is triggered within the RRC although it is appreciated that the trigger could be implemented elsewhere within the network. The trigger event comprises for example changes (i.e., rising or falling) in timing advance (TA) values. In another embodiment, the trigger event comprises RRC mode changes in order to support a differing quality of service (QoS). For instance, the trigger event might occur if the RRC determines that the peak data rate required by the UE cannot be provided in a half-duplex FDD mode; a trigger event (in the form of a signal message) will tell the RRC and/or the UE that a higher quality of service mode (such as the aforementioned full-duplex FDD mode) is needed. For lossy applications, this threshold may be set below the peak data rate required by the service; e.g., so that only the peaks of the rate curve cannot be services, thereby resulting in a small but acceptable rate of loss, so that half-duplex operation can be maintained under certain circumstances where it is desirable for other reasons.

At step 606, an entity (either at the UE or at the network side) determines that the network operation can be optimized by changing the duplex mode. During this step, the entity may consider one or more factors in its decision, such as for example timing advance (TA) variables, data rates, hardware capabilities, network operational parameters, etc. In one variant of this embodiment, it is determined that the UE and eNB would benefit if switched from a half-duplex FDD mode to a full-duplex FDD mode if the TA value exceeds an upper threshold, and thus DL transmission efficiency would decrease below an acceptable limit in the subframe in which the DL-UL switch occurs. Alternatively it may be determined that the UE and eNB would benefit if switched from a full-duplex FDD mode to a half-duplex FDD mode if the TA value falls below a lower threshold.

In yet another embodiment, semi-static half-duplex FDD mode is determined to be a mode of operation that best benefits the UE and eNB. This might be determined for example, if a timing advance (TA) value exceeds an upper threshold, or conversely if the (TA) value falls below a lower threshold, and then the UE is switched from semi-static to dynamic half-duplex FDD mode.

At step 608, the network assigns one transmission pattern of the configured set of transmission patterns to each UE. Thereafter, the UL and DL transmissions will take place according to the defined transmission pattern; i.e., eNodeB and UEs schedule the UL and DL transmissions according to the defined transmission pattern. To ensure that a plurality of UEs may be served efficiently, the configured transmission patterns are distributed among all UEs operating in semi-static half-duplex FDD mode (e.g., by usage of a uniform distribution, for improving cell throughput—the Guard Subframes (GS) in each transmission pattern for one UE are efficiently allocated to other UEs to increase efficiency of the cell throughput).

At step 610, the network and serviced UE(s) switch over to the second duplex mode synchronously. In one embodiment, the UE and base station will dynamically negotiate and modify connections using the Radio Resource Control (RRC), and the UE transceiver mode is controlled directly by the base station. In one variant of this embodiment, the RRC protocol layer at the base station maintains a connection between each of the UEs, and controls the radio resources which are assigned to each UE, The RRC is able to determine and schedule semi-static half-duplex operation to optimize network utilization among the plurality of UEs.

At step 612, the eNB and one or more UEs begin operating in the second duplex mode (e.g., full-duplex, dynamic half-duplex or semi-static half-duplex).

First Example

The following example further illustrates the switching from full-duplex FDD to a half-duplex FDD mode of operation according to the present invention in the context of one exemplary UMTS-based implementation.

An LTE radio cell supporting both full-duplex and (dynamic and semi-static) half-duplex FDD modes comprises an RRC connection with a single UE. The network signals its support of the FDD modes in the radio cell, via system information; which is broadcast to the UE in the cell.

For the semi-static half-duplex FDD mode of operation, eight (8) periodic transmission patterns are configured in the cell as illustrated in FIG. 5A. The length of each periodic transmission pattern is eight (8) subframes consisting of three (3) UL and three (3) DL subframes each. The set of UL and DL subframes each is separated by one Guard Subframe (GS). Configuration 1 of FIG. 5A is the base transmission pattern, whereas configurations 2 through 8 are cyclic shifted versions of the base transmission pattern of configuration 1. These exemplary patterns have a relationship in time between UL and DL transmissions which automatically meet HARQ timing requirements.

The exemplary UE supports both full-duplex FDD and half-duplex FDD modes. The UE has selected full-duplex FDD mode after switch-on as a result of default settings specified by the network operator (or the UE manufacturer). The UE enters the RRC_CONNECTED state and performs a voice call. For the switch between full-duplex FDD and semi-static half-duplex FDD, and vice versa, the exemplary transmission frame structure and signaling flow is as illustrated in FIG. 7 and FIG. 8.

Figure 7:
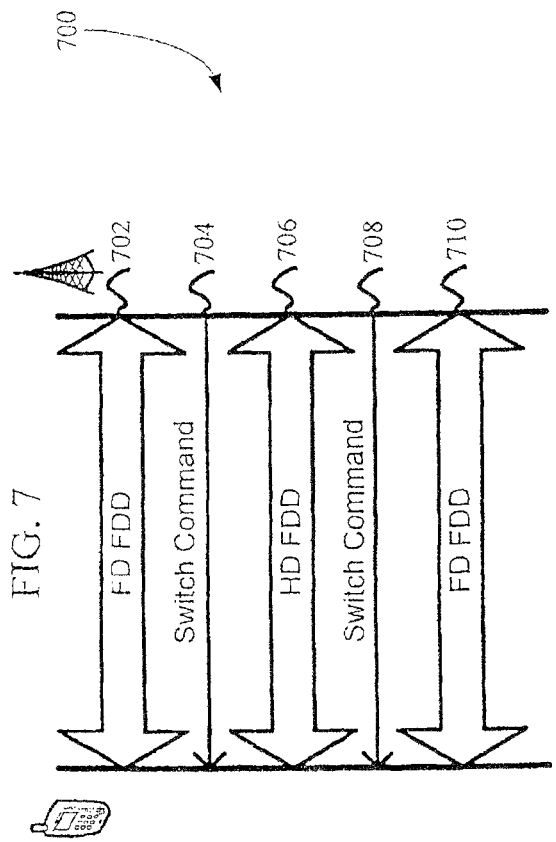
FIG. 7 is a graphical representation illustrating an exemplary control messaging flow between a UMTS UE and a base station in accordance with the principles of the present invention.
Figure 8:
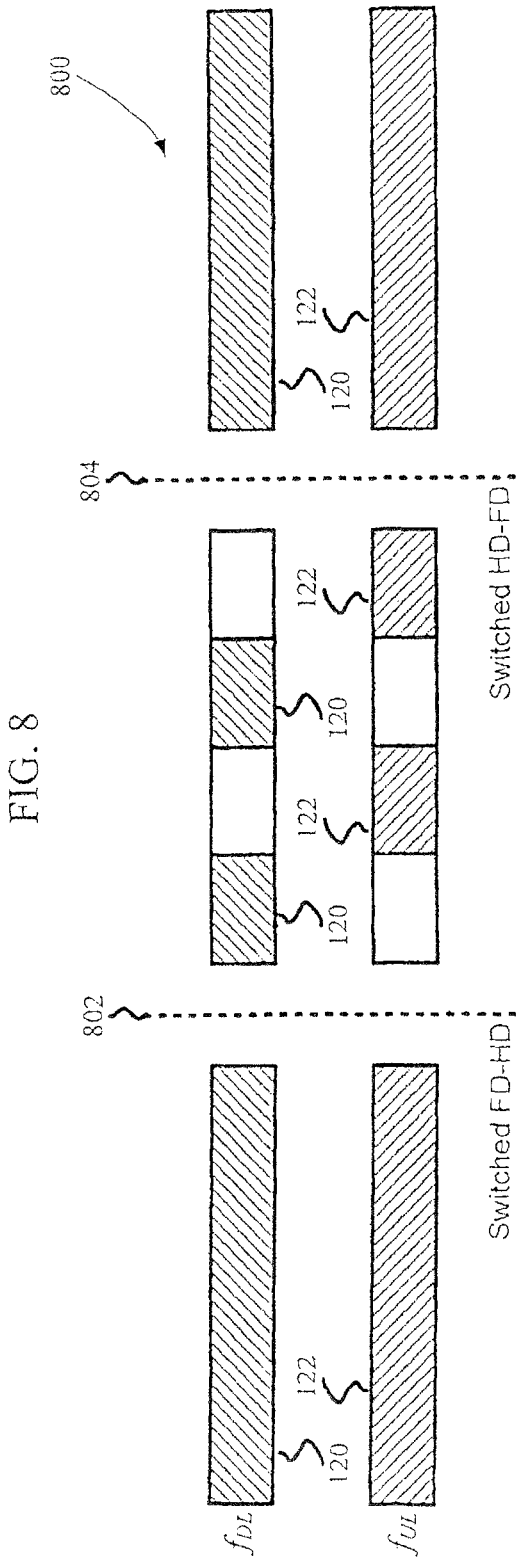
FIG. 8 is a graphical representation illustrating an exemplary switch from a full-duplex FDD mode to a half-duplex FDD mode and back to full-duplex FDD mode operation in accordance with the principles of the present invention.

Referring now to step 702 of FIG. 7, while in the RRC_CONNECTED state, the UE is operated in full-duplex FDD mode. In response to timing advance adjustments, the UE is switched from full-duplex FDD mode to semi-static half-duplex FDD mode as the TA value falls below a specified threshold value (which may be specified in a deterministic or derivative fashion as well). This switch is triggered by an explicit switch command sent by eNodeB at step 704 (see also step 802 of FIG. 8).

Figure 9:
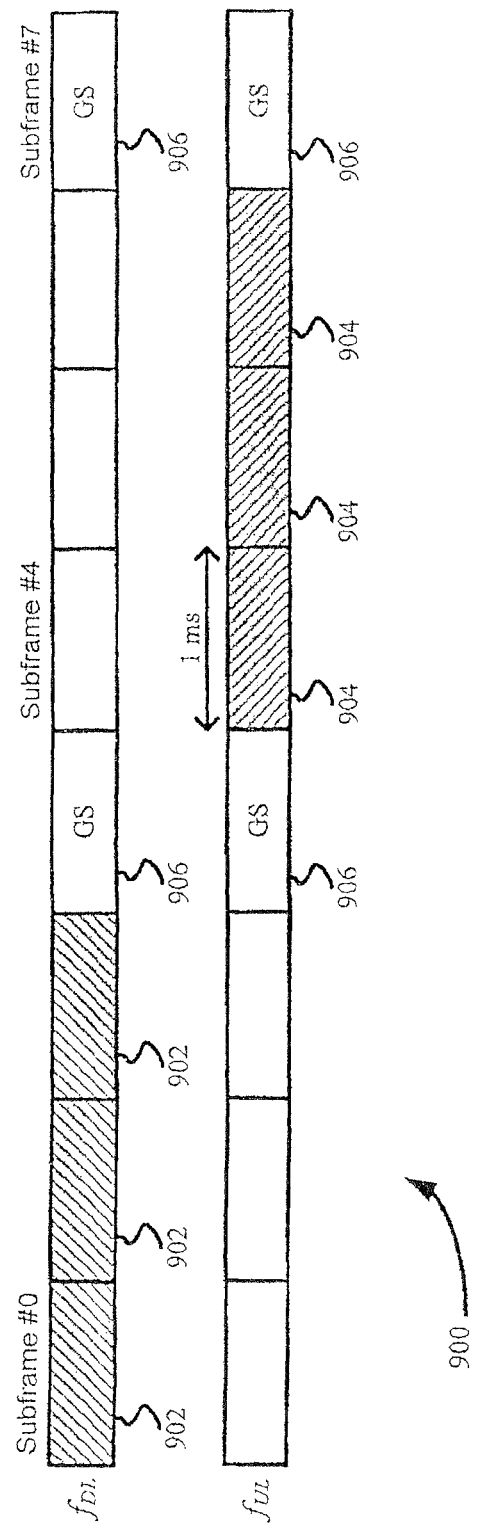
FIG. 9 is a graphical representation illustrating an exemplary periodic UL-DL transmission pattern in accordance with the principles of the present invention.

At step 706, the network operates in a semi-static half-duplex FDD mode operation, and the UE operates according to periodic transmission pattern configuration 1 as further depicted in FIG. 9. As shown, the periodic transmission pattern 900 is comprised of downlink transmissions 902, uplink transmissions 904, and guard subframes 906. The uplink transmission subframe N has a HARQ response at downlink transmission subframe N+4 (downlink subframe 0 carries the HARQ of preceding uplink subframe No. 4, downlink subframe 1 carries the HARQ of preceding uplink subframe No. 5, etc.). The guard subframes 906 are implemented at the UE only, as the UE requires a small amount of time to switch from uplink to downlink and vice versa.

Due to further timing advance adjustments, the UE is switched back from semi-static half-duplex FDD to full-duplex FDD mode as the TA value exceeds an upper threshold. This switch is triggered by an explicit switch command by eNodeB at step 708 (See also step 804 of FIG. 8). After the switch, the UE is operated again in full-duplex FDD mode at step 710.

Second Example

The following example illustrates an exemplary method for switching between a dynamic half-duplex FDD mode of operation to a semi-static half-duplex FDD mode of operation implemented with multiple UEs.

For the semi-static half-duplex FDD mode operation eight (8) periodic transmission patterns are configured in the cell as illustrated in FIG. 5A. The length of each periodic transmission pattern is eight (8) subframes consisting of three (3) UL and three (3) DL subframes each, the set of UL and DL subframes each is separated by one Guard Subframe (GS). Configuration 1 of FIG. 5A is the base transmission pattern, whereas configurations 2 to 8 are cyclic shifted versions of the base transmission pattern. These exemplary patterns illustrated have a relationship in time between UL and DL transmissions which automatically meet HARQ timing requirements.

Four (4) UEs (UE1 through UE4) are in the RRC_CONNECTED state and are operated in a dynamic half-duplex FDD mode. All four (4) UEs are performing a voice call. It is assumed that due to timing advance adjustments, the four (4) UEs are switched from dynamic to semi-static half-duplex FDD mode as the TA values for all UEs exceed an upper threshold value. This switch is triggered by an explicit switch command sent by eNodeB.

Within each dedicated switch command, each UE is assigned a periodic transmission pattern according to FIG. 5A. For improving cell throughput; i.e. to efficiently use the introduced Guard Subframes (GS) in each transmission pattern where no transmissions take place, eNodeB assigns the transmission pattern: configuration 1 to UE1, configuration 2 to UE2, configuration 6 to UE3 and configuration 8 to UE4.

After the switch, the UL and DL transmissions for each UE take place according to the defined transmission pattern. In one illustrative example, during the post-transmission Guard Subframe of UE operating in configuration 1, UE operating in configuration 2 is able to transmit its uplink. This overlapping of data transmission over guard subframes is possible because the guard frames are observed by the UEs, but not by the serving base station. In this manner, half-duplex FDD transmission allows the UEs to efficiently use the spectral resources. The duplexer operation is not necessary in half-duplex FDD allowing the UE to conserve resources such as power consumption.

Exemplary UE Apparatus—

Figure 10:
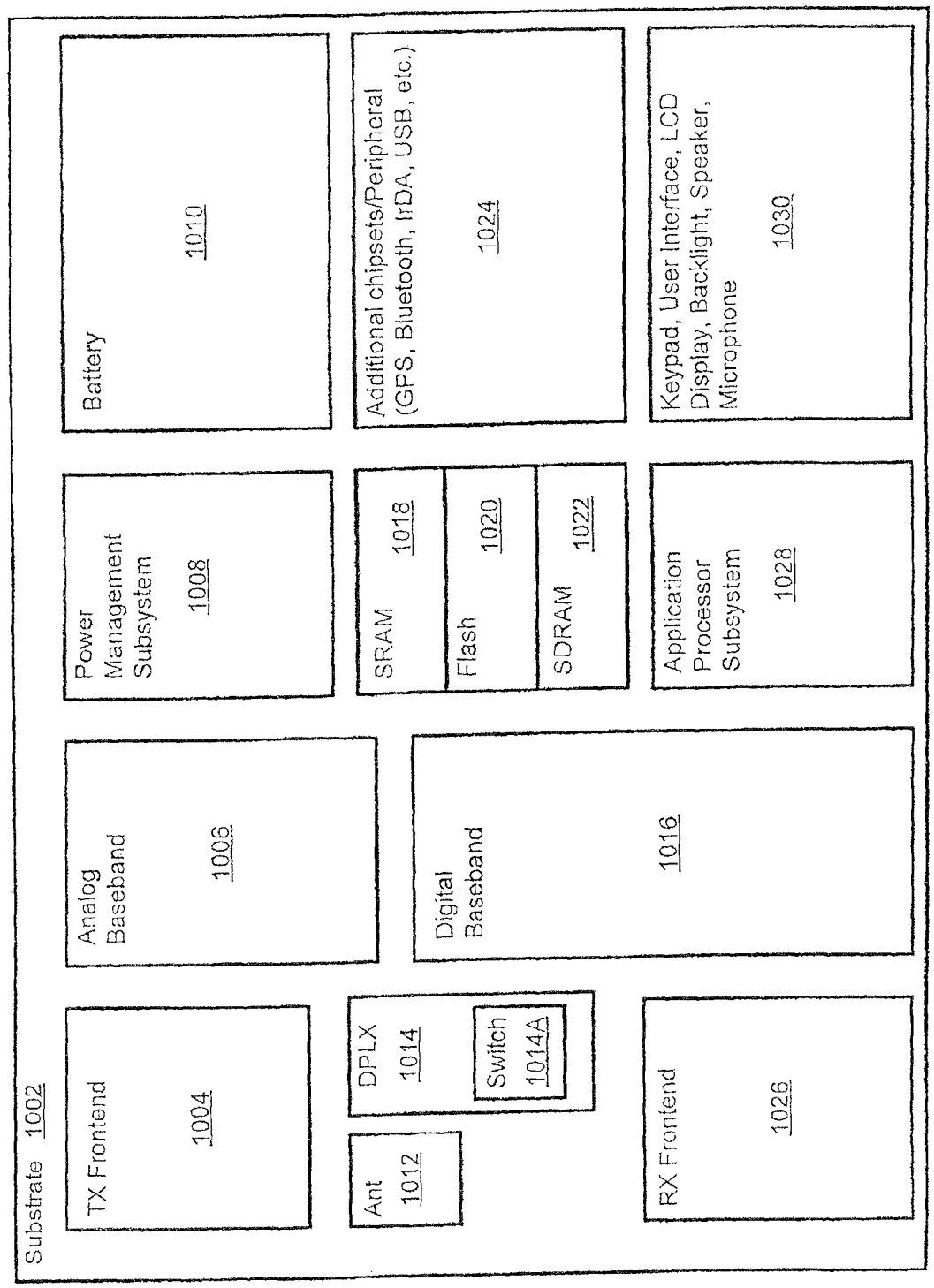
FIG. 10 is a functional block diagram illustrating one embodiment of a UE apparatus adapted to implement the methods of the present invention.

Referring now to FIG. 10, exemplary client or UE apparatus 1000 useful in implementing the methods of the present invention are illustrated. The apparatus disclosed comprises, inter alia, a UE such as a portable computer or mobile communications device capable of switching between full-duplex and half-duplex modes. The base station functionality is preferably performed in software, although hardware embodiments are also envisioned; this apparatus is described subsequently herein with respect to FIG. 11.

The UE apparatus 1000 comprises an application processor subsystem 1028 such as a digital signal processor, microprocessor, field-programmable gate array, or plurality of processing components mounted on one or more substrates 1002. The processing subsystem may also comprise an internal cache memory. The processing subsystem 1028 is connected to a memory subsystem comprising memory which may for example, comprise SRAM 1018, flash 1020 and SDRAM 1022 components. The memory subsystem may implement one or a more of DMA type hardware, so as to facilitate data accesses as is well known in the art.

The radio/modem subsystem comprises a digital baseband 1016, analog baseband 1006, RX frontend 1026 and TX frontend 1004. The apparatus 1000 further comprises an antenna assembly 1012 and duplex component 1014; the duplexing component may comprise a simple switch 1014A for switching between antenna operations. The switch 1014A may also comprise a discrete component. While specific architecture is discussed, in some embodiments, some components may be obviated or may otherwise be merged with one another (such as RF RX, RF TX and ABB combined, as of the type used for 3G digital RFs) as would be appreciated by one of ordinary skill in the art given the present disclosure.

During a mode switch, an exemplary UE digital baseband modem 1016 decodes a message from the UTRAN, instructing the UE to change modes via a configuration assignment. The digital baseband modem 1016 fetches the configuration from the memory subsystem; in one embodiment the transmission pattern configurations are pre-stored in flash 1020 for non-volatile storage and loaded to SDRAM 1022 during modem operation. The transmission pattern configurations are used by the digital baseband modem 1016 to appropriately schedule transmission and reception operation. In most instances, the digital baseband modem 1016 does not have direct access to the duplexing/switching component 1014.

The Analog Baseband 1006 controls operation of the radio frontends and converts a digital signal (input from the digital baseband modem 1016) to an analog representation for transmission. Therefore, the digital baseband modem 1016 loads the analog baseband 1006, with scheduling parameters for the upcoming frame. The duplexing component 1014 may include a simple switch 1014A the control of duplex operation or switch operation being controlled by the analog baseband 1006. The control of TX and RX frontends are also controlled by the analog baseband 1006.

A combination duplexer and switch component provides a benefit in terms of both board space and interfaces; however, it may not always be possible to combine these components, due to design issues, such as reverse compatibility or cost of redesign. The duplexer may be powered off when the UE is operating using the switching mechanism, thereby saving power consumption via obviating the costly duplexing operation. Powering off the duplexer is not strictly necessary for operation, and may be ignored for systems which are not concerned with power management, or are otherwise unable to toggle power to the duplexer.

A UE using a simple analog baseband 1006 which is unable to support half-duplex operation may still be required to implement half-duplex operation using general purpose I/Os (e.g., software activated switch) to control switching, so as to enable other UE on the network to operate in half-duplex. Due to the incompatibility of half-duplex operation with full-duplex operation, any UE incapable of operating in half-duplex would necessarily disable half-duplex operation for the entire community of UEs. Therefore, in some embodiments, the control for switching may be implemented in a separate interface from the duplexer on the analog baseband 1006. In one embodiment, the simple switch 1014A may be a separate assembly with a separate control mechanism controlled by the analog baseband 1006. In other embodiments, the digital baseband 1016 may need to directly control the duplexer/switch assembly; such a scheme may not be preferable for the UE, but may be implemented for the benefit of other UE's within the network.

The illustrated power management subsystem (PMS) 1008 provides power to the UE, and may comprise an integrated circuit and or a plurality of discrete electrical components. In one exemplary portable UE apparatus, the power management subsystem 1008 advantageously interfaces with a battery 1010.

The user interface system 1030 comprises any number of well-known I/O including, without limitation: a keypad, touch screen, LCD display, backlight, speaker, and microphone. However, it is recognized that in certain applications, one or more of these components may be obviated. For example, PCMCIA card type UE embodiments may lack a user interface (as they could piggyback onto the user interface of the device to which they are physically and/or electrically coupled).

The apparatus 1000 further comprises optional additional peripherals 1024 including, without limitation, one or more GPS transceivers, or network interfaces such as IrDA ports, Bluetooth transceivers, USB, Firewire, etc. It is however recognized that these components are not necessarily required for operation of the UE in accordance with the principles of the present invention.

Exemplary Serving Base Station Apparatus—

Figure 11:
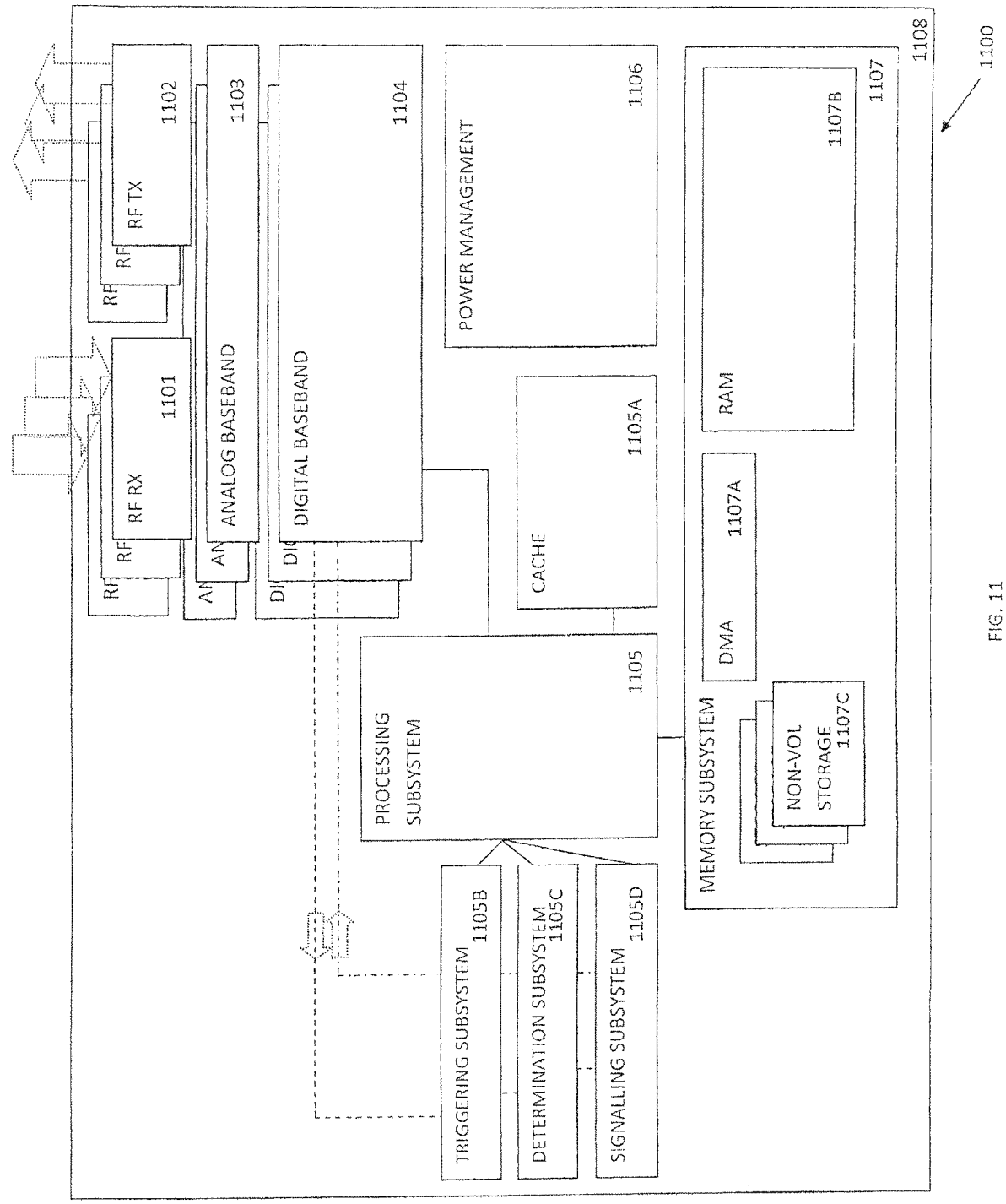
FIG. 11 is a functional block diagram illustrating one embodiment of a serving base station apparatus adapted to implement the methods of the present invention.

Referring now to FIG. 11, exemplary serving base station apparatus 1100 useful in implementing the methods of the present invention are illustrated. The base station apparatus 1100 comprises one or more substrate(s) 1108 that further include a plurality of integrated circuits including a processing subsystem 1105 such as a digital signal processor (DSP), microprocessor, gate array, or plurality of processing components as well as a power management subsystem 1106 that provides power to the base station 1100.

The embodiment of the apparatus 1100 shown in FIG. 11 at a high level comprises a broadcasting circuit configured to broadcast a default duplexing mode of operation to the wireless network; The broadcasting subsystem comprises a digital baseband 1104, analog baseband 1103, and RF components for RX 1101 and TX 1102. While multiple subsystems are illustrated, it is appreciated that future developments may consolidate the broadcasting subsystem, in whole or in part.

The processing subsystem 1105 may comprise a plurality of processors (or multi-core processor(s)). Additionally, the procession subsystem likely also comprises a cache 1105A to facilitate processing operations. In the disclosed invention, additional subsystems for triggering 1105B, mode determination 1105C, and signaling 1105D are also required. As illustrated in FIG. 11, these subsystems may be implemented in software or hardware which is coupled to the processing subsystem. Alternatively, in another variant, the subsystems may be directly coupled to the broadcasting subsystem.

The disclosed embodiment of the present invention furthermore connects the detecting circuit 1105B, to the mode determining circuit 1105C, to the signaling subsystem 1105D, The detecting circuit detects a triggering event associated with the wireless network. The determining circuit decides the duplexing mode of operation which would optimally benefit the wireless network. The signaling circuit controls signaling to each of the client device(s) (e.g., UE) to operate in the different duplexing mode of operation.

The processing subsystem 1105 is preferably connected to a memory subsystem 1107. The memory subsystem comprises a direct memory access (DMA), operational random access memory (RAM) 1107B, and non-volatile memory 1107C.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method, comprising:
at a user equipment (UE) connected to a wireless network:
receiving a first indication that a first duplexing mode is being used for the wireless network;
transmitting a second indication to the wireless network that indicates a condition present within the wireless network, wherein the second indication communicates to the wireless network to determine whether a second duplexing mode should be used for the UE, wherein the condition is based on a characteristic of a wireless connection between the user equipment and the wireless network; and
receiving a third indication from the wireless network that the second duplexing mode is to be used for the wireless network, wherein the third indication further causes the UE to dynamically negotiate and modify connections with the wireless network using a Radio Resource Control (RRC) protocol.

2. The method of claim 1, wherein the first duplexing mode comprises a frequency division duplexing (FDD) mode of operation or a time division duplexing (TDD) mode of operation.

3. The method of claim 1, wherein the first duplexing mode comprises a half-duplex frequency division duplexing (FDD) mode of operation or a full-duplex FDD mode of operation.

4. The method of claim 3 wherein the second duplexing mode comprises a half-duplex FDD mode of operation or a full-duplex FDD mode of operation.

5. The method of claim 1, wherein the first duplexing mode comprises a dynamic half-duplex frequency division duplexing (FDD) mode of operation or a semi-static half-duplex FDD mode of operation, wherein the semi-static half-duplex FDD mode of operation centralizes control of radio resources to a base station and wherein the UE access is scheduled over guard slots.

6. The method of claim 1, wherein the UE is configured to operate in a plurality of frequency division duplexing (FDD) modes.

7. The method of claim 6, wherein the first duplexing mode is a first FDD mode of the plurality of FDD modes.

8. The method of claim 1, wherein the second duplexing mode is a second FDD mode of the plurality of FDD modes.

9. The method of claim 1, wherein the first duplexing mode or the second duplexing mode comprises a time division duplexing (TDD) mode of operation.

10. A user equipment (UE), comprising:
receiving a first indication that a first duplexing mode is being used for a wireless network;
transmitting a second indication to the wireless network that indicates a condition present within the wireless network, wherein the second indication communicates to the wireless network to determine whether a second duplexing mode should be used for the UE, wherein the condition is based on a characteristic of a wireless connection between the UE and the wireless network; and
receiving a third indication from the wireless network that the second duplexing mode is to be used for the wireless network, wherein the third indication further causes the UE to dynamically negotiate and modify connections with the wireless network using a Radio Resource Control (RRC) protocol.

11. The UE of claim 10, wherein the first duplexing mode comprises a half-duplex frequency division duplexing (FDD) mode of operation or a full-duplex FDD mode of operation.

12. The UE of claim 11 wherein the second duplexing mode comprises a half-duplex FDD mode of operation or a full-duplex FDD mode of operation.

13. The UE of claim 11, wherein the second indication corresponds to a quality of service (QoS) requirement of the UE.

14. The UE of claim 11, wherein the condition comprises an energy status of a battery of the UE crossing a threshold.

15. The UE of claim 11, wherein the condition comprises an timing advance value crossing a threshold.

16. The UE of claim 11, wherein the first indication is included in system information broadcasted by the wireless network.

17. An integrated circuit (IC), comprising:
circuitry configured to connect to a wireless network;
circuitry configured to receive a first indication that a first duplexing mode is being used for the wireless network;
circuitry configured to generate for transmission a second indication to the wireless network that indicates a condition present within the wireless network, wherein the second indication communicates to the wireless network to determine whether a second duplexing mode should be used for the IC, wherein the condition is based on a characteristic of a wireless connection between the IC and the wireless network; and
circuitry configured to receive a third indication from the wireless network that the second duplexing mode is to be used for the wireless network, wherein the third indication further causes the IC to dynamically negotiate and modify connections with the wireless network using a Radio Resource Control (RRC) protocol.

18. The IC of claim 17, wherein the IC is configured to operate in a plurality of frequency division duplexing (FDD) modes.

19. The IC of claim 18, wherein the first duplexing mode is a first FDD mode of the plurality of FDD modes.

20. The IC of claim 19, wherein the second duplexing mode is a second FDD mode of the plurality of FDD modes.

* * * * *

UNITED STATES PATENT AND TRADEMARK OFFICE
CERTIFICATE OF CORRECTION

PATENT NO. : 10,630,458 B2
APPLICATION NO. : 16/124830
DATED : April 21, 2020
INVENTOR(S) : Choi et al.

Page 1 of 1

It is certified that error appears in the above-identified patent and that said Letters Patent is hereby corrected as shown below:

In the Claims

Claim 15, Column 22, Line 31:
"an timing advance value crossing a threshold." should read "a timing advance value crossing threshold."

Signed and Sealed this
Thirtieth Day of June, 2020

Andrei Iancu
*Director of the United States Patent and Trademark Office*